United States Patent
Duplys (10) Patent No.: US 12,255,917 B2
(45) Date of Patent: Mar. 18, 2025

(54) REMOTE INTRUSION MONITORING

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 336 days.

(21) Appl. No.: 17/662,371

(22) Filed: May 6, 2022

(65) Prior Publication Data

US 2022/0385691 A1    Dec. 1, 2022

(30) Foreign Application Priority Data

May 27, 2021 (DE) .................... 10 2021 205 387.4

(51) Int. Cl.
*H04L 9/40* (2022.01)
*H04L 41/14* (2022.01)
*H04L 41/147* (2022.01)

(52) U.S. Cl.
CPC ........ *H04L 63/1458* (2013.01); *H04L 41/145* (2013.01); *H04L 41/147* (2013.01); *H04L 63/1416* (2013.01)

(58) Field of Classification Search
CPC . H04L 63/1458; H04L 41/145; H04L 41/147; H04L 63/1416; H04L 41/046; H04L 63/1425; H04L 41/06; G06F 9/45533
USPC .......................................................... 726/24
See application file for complete search history.

(56) References Cited

U.S. PATENT DOCUMENTS

| | | | | |
|---|---|---|---|---|
| 7,891,001 | B1 * | 2/2011 | Greenawalt | H04L 63/20 713/153 |
| 2002/0116635 | A1 * | 8/2002 | Sheymov | G06F 9/445 726/24 |
| 2006/0031476 | A1 * | 2/2006 | Mathes | H04L 67/34 709/224 |
| 2013/0290404 | A1 * | 10/2013 | Rajabi | G06F 21/54 709/203 |
| 2019/0342187 | A1 * | 11/2019 | Zavesky | H04L 41/0895 |

OTHER PUBLICATIONS

A Cloud-Based Internet of Things Platform for Ambient Assisted Living, Cubo et al, Aug. 2014 (Year: 2014).*

* cited by examiner

*Primary Examiner* — Jahangir Kabir
(74) *Attorney, Agent, or Firm* — NORTON ROSE FULBRIGHT US LLP; Gerard A. Messina (57) ABSTRACT

A computer implemented method for remote intrusion monitoring of a networked device. The method includes: receiving, by an intrusion detection engine connected to a network, a network communication to a first networked device; transmitting, via the intrusion detection engine, a duplicate of the network communication to a second networked device, wherein the second networked device hosts at least one virtual model of the first networked device; applying the duplicated network communication to the at least one virtual model of the first network device hosted by the second networked device; and monitoring, using a monitoring engine, the at least one virtual model of the first networked device upon reception of the duplicated network communication by the at least one virtual model.

17 Claims, 4 Drawing Sheets

REMOTE INTRUSION MONITORING

CROSS REFERENCE

The present application claims the benefit under 35 U.S.C. § 119 of German Patent Application No. DE 10 2021 205 387.4 filed on May 27, 2021, which is expressly incorporated herein by reference in its entirety.

FIELD

The present invention relates to a computer implemented method for for remote intrusion monitoring of a networked device, and an associated apparatus, computer system, and computer readable medium.

BACKGROUND INFORMATION

Existing computer network intrusion detection approaches comprise an intrusion detection agent running on a monitored device. The intrusion detection agent collects certain information about the state of the monitored device, such as a manifest of the running processes of the operating system, or the incoming network traffic. The information collected by the intrusion detection agent is transmitted to an intrusion detection backend, often located at a physically remote security operations centre. Additional data analysis pipelines are used to process the information received from the intrusion detection agent.

Running an intrusion detection agent on the monitored device implies that the monitored device has the computational resources to operate the intrusion detection agent reliably, whilst simultaneously performing its assigned tasks. In the context of an electronic control unit (ECU) for a vehicle or an industrial controller, the assigned tasks may be safety-critical.

Furthermore, an electronic control unit (ECU) for a vehicle or an industrial controller may use computational hardware that is limited in computational power (such as, for example, an embedded microcontroller). This implies a limit on the performance of the intrusion detection agent and/or the monitored device.

Accordingly, computer network intrusion detection approaches may be further improved.

SUMMARY

According to a first aspect of the present invention, there is provided a computer implemented method for remote intrusion monitoring of a networked device. In accordance with an example embodiment of the present invention, the method includes:
  receiving, by an intrusion detection engine connected to a network, a network communication to a first networked device;
  transmitting, via the intrusion detection engine, a duplicate of the network communication to a second networked device, wherein the second networked device hosts at least one virtual model of the first networked device;
  applying the duplicated network communication to the at least one virtual model of the first network device hosted by the second networked device; and
  monitoring, using a monitoring engine, the at least one virtual model of the first networked device upon reception of the duplicated network communication by the at least one virtual model.

An effect is that intrusion detection is performed in respect of the first networked device without requiring the deployment of intrusion detection agent software to the first networked device. The first networked device can be operated without the associated computational overhead of a native intrusion detection agent. Thus, the computational resources of the first networked device may be reallocated to user-perceivable, or safety relevant aspects. The first networked device does not need to contend for communication resources with a native intrusion detection agent. The at least one virtual model is hosted in a separate location to the first networked device, and thus a cyber-attack against the first networked device cannot be directed to an intrusion monitor in the attacked device.

Another benefit is that an intrusion detection agent having arbitrary precision may be designed, even for computationally constrained devices. The at least one virtual model is decoupled from the monitored device, and can be executed in any location remote from the first networked device, on an edge device, on a gateway server, or in cloud infrastructure. The at least one virtual model can be configured to simulate as much, or as little of the functionality of the first networked device as is desirable. In other words, whilst the amount of information collected, stored, and transmitted by a hosted IDS is limited by the hardware of the hosting device, a virtual model suffers from no performance restrictions.

Furthermore, the monitoring of the first networked device via the at least one virtual model can be performed at a separate location both to the at least one virtual model, and the first networked device. In other words, the subject that is being monitored is not limited by the computational resources of the first networked device.

An additional benefit is that the agent-free intrusion detection disclosed herein decouples the IDS functionality from the first networked device. As an example, adding a new monitor or collecting additional information for IDS purposes does not require a software update to the first networked device. As a result, the agent-free IDS approach is easier to update and maintain, because no software updates concerning intrusion monitoring have to be pushed to the first networked device. The maintenance involves configuring the virtual model and one or more monitors that run, for example, in the edge or cloud infrastructure which is easier to access. Agent-free intrusion detection can be offered in a manner that is completely decoupled from the actual embedded devices. As an example, such an IDS service can be subscribed to at any point in time, given that an appropriate model for the digital twin is available and the IDS functionality can be improved over time without any technical dependencies from the actual devices.

As a connected point, the architecture of agent-free IDS makes facilitates the provision of an IDS infrastructure that allows the monitoring of fleets of embedded devices, and the use a cross-device perspective for an even more precise intrusion detection. This is especially true if the virtual models (digital twins) run in an edge or cloud infrastructure they may be connected into a single monitoring system.

According to a second aspect of the present invention, there is provided an apparatus for remote intrusion monitoring of a networked device. In accordance with an example embodiment of the present invention, the apparatus comprises a communications interface, a data memory, and a processor. The communications interface is configured to communicate with a network to receive at least one network communication to a first networked device. The processor is configured to host a processing environment in the data memory comprising at least one virtual model of the first networked device, an intrusion detection engine, and a monitoring engine, wherein the intrusion detection engine is configured to receive a duplicate of the at least one network communication to a first networked device, and to apply the duplicated network communication to the at least one virtual model of the first network device hosted by the processing environment, and to monitor, using the monitoring engine hosted by the processing environment, the at least one virtual model of the first networked device upon reception of the duplicated network communication by the at least one virtual model.

According to a third aspect of the present invention, there is provided a computer system comprising a wide area network connection, a first networked device, a second networked device, and a communications network configured to communicatively couple at least the wide area network connection, the first and second networked devices. In accordance with an example embodiment of the present invention, the second networked device is configured to host at least an intrusion detection engine, at least one virtual model of the first networked device, and a monitoring engine. The intrusion detection engine is configured to receive a network communication from the wide area connection to the first networked device, and the intrusion detection engine is configured to transmit a duplicate of the network communication to the at least one virtual model. The intrusion detection engine is configured to apply the duplicated network communication to the at least one virtual model of the first networked device hosted by the second networked device, and the monitoring engine is configured to monitor the at least one virtual model of the first networked device upon reception of the duplicated network communication by the at least one virtual model.

According to a fourth aspect of the present invention, there is provided a computer readable medium comprising executable program instructions which, when executed by a processor, performs the steps of the first aspect or its embodiments.

BRIEF DESCRIPTION OF THE DRAWINGS

Exemplary embodiments are depicted in the figures, which are not to be construed as limiting the present invention, and are explained in greater detail below.

DETAILED DESCRIPTION OF EXAMPLE EMBODIMENTS

The intrusion detection approach discussed in the background information section above is well-suited to enterprise computer systems, where each monitored device is a highly specified computer (such as a desktop computer). The monitored devices benefit from an abundance of computational resources, and the network connection between the monitored devices and the intrusion detection backend benefits from a high bandwidth.

Embedded computational devices, on the other hand, are constrained in terms of their CPU speed and architecture. Embedded computational devices may rely on low-bandwidth data connections, such as the ZigBee™ standard, for example. Embedded computational devices may be battery-powered. Therefore, running an intrusion detection system (IDS) agent on an embedded system is challenging, because the functionality of such an agent is limited by the resources available on that device, and adding an IDS agent is traded-off against the impact on specified features of the monitored device. Furthermore, transmitting information generated by the IDS agent to the IDS backend reduces the limited bandwidth available for the intended function of the embedded device.

Examples of embedded computational devices are the Intel Atom™ D410, having a single core and a core speed of 1.66 GHz; the "Blackfin" ™ by Analog Devices™; Freescale 68HC11 (8-bit), 68HC16 (16-bit), Freescale Kinetis (ARM-based); any controller using one or more ARM™ cores, Infineon XC800 (8-bit, Infineon XC 2000 (16-bit), Infineon XMC4000 (32-bit); Microchip "PIC" ™ embedded microcontrollers; Renesas 720 (4-bit), 740 (8-bit), H8 (16 bit), and H8SX (32 bit); STMicroelectronics ST6, ST10, SPC5, ST20, and STM32; and Texas Instruments "Stellaris" ™ and Tiva™ designs. A skilled person will appreciate that the techniques discussed herein are applicable to intrusion detection systems intended to operate on a wide range of embedded processors or microcontrollers, and are not limited to those listed here.

The computational resources available to a networked device are also significantly affected by the operating system and software installed on the network device. An example of a real-time operating system (RTOS) that may be used in resource-constrained applications is ZephyrOS™, Azure RTOS (Microsoft™), FreeRTOS™, TinyOS™, Windows IoT™, WindRiver Rocket™, or Google Brillo™.

Examples of security events that may be relevant to a networked device are many and varied. Devices that are wirelessly connected to a network such as the internet, or a LAN, such as via Ethernet or by IEEE 802.11 WiFi™, V2X, and cellular (such as 3GPP) may be vulnerable to port scanning, eavesdropping, denial of service, or spoofing. Conventionally, a networked device hosts an intrusion detection agent.

Figure 1:
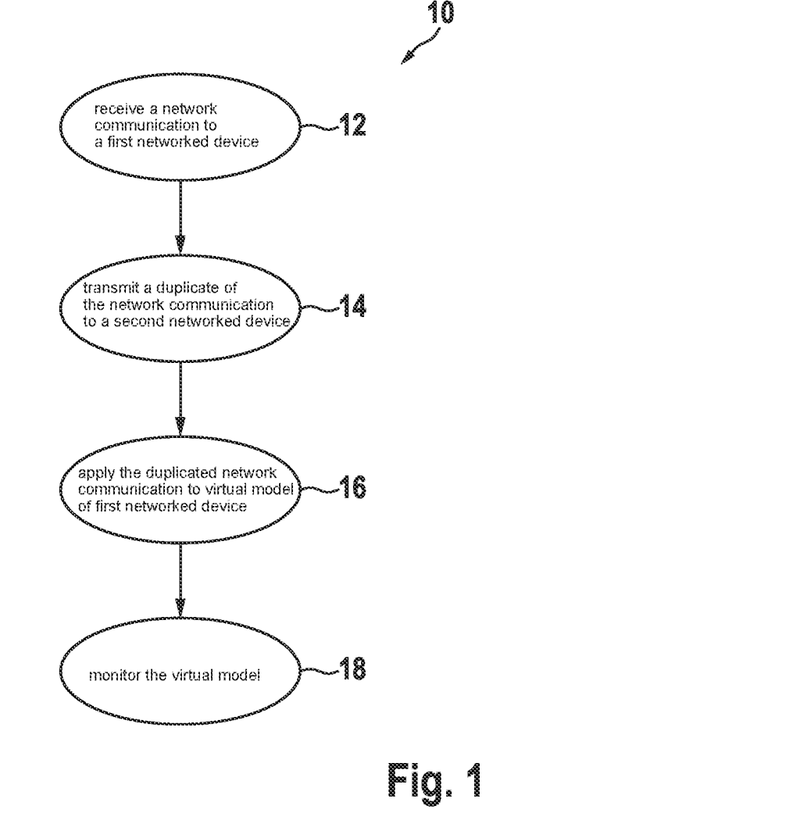
FIG. 1 schematically illustrates an example method according to the first aspect of the present invention.

FIG. 1 schematically illustrates a method according to the first aspect of the present invention.

According to a first aspect, there is provided a computer implemented method (10) for remote intrusion monitoring of a networked device, comprising:
- receiving (12), by an intrusion detection engine connected to a network, a network communication to a first networked device;
- transmitting (14), via the intrusion detection engine, a duplicate of the network communication to a second networked device, wherein the second networked device hosts at least one virtual model of the first networked device;
- applying (16) the duplicated network communication to the at least one virtual model of the first network device hosted by the second networked device; and monitoring (18), using a monitoring engine, the at least one virtual model of the first networked device upon reception of the duplicated network communication by the at least one virtual model.

Figure 2:
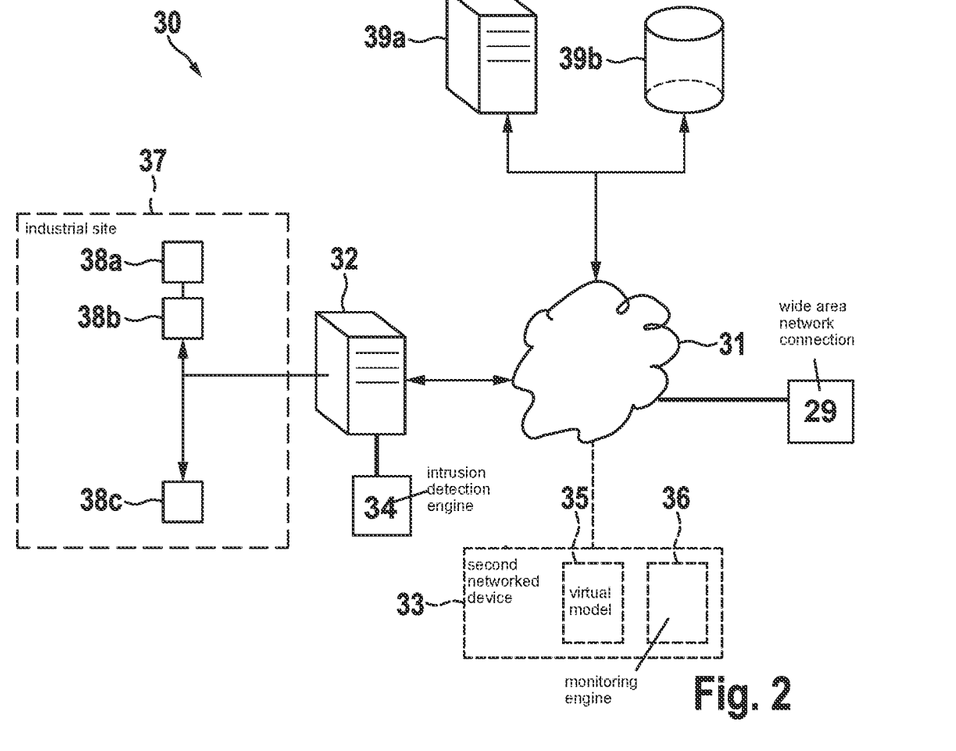
FIG. 2 schematically illustrates a system comprising an apparatus for remote intrusion detection, in accordance with an example embodiment of the present invention.

FIG. 2 schematically illustrates a system comprising an apparatus for remote intrusion detection to facilitate a discussion of the operational context of the method.

For example, the system 30 comprises a set of first networked devices 38a, 38b, 38c installed in an industrial site 37. For example, the first networked devices 38a, 38b, 38c may comprise remote thermometers, remote process monitoring cameras, remote microphones, and any other form of "Internet of Things" (IoT) sensor. A gateway server 32 may be provided as an interface, communicatively coupling the set of first networked devices 38a, 38b, 38c and a communications network 31. Alternatively, the set of first networked devices 38a, 38b, 38c may communicatively coupled directly to the communications network 31. The gateway server 32 is configured to host, for example, an intrusion detection engine 34 that is communicatively coupled to a second networked device 33.

The second networked device 33 is communicatively coupled to the gateway server 32 via the communication network 31. The second networked device 33 is configured to host at least one virtual model 35 of a corresponding one or more network device 38a of the set of first networked devices 38a, 38b, 38c. Another term for the at least one virtual model 35 is a "digital twin" of the corresponding first networked device 38a. The second networked device 33 is configured to host at least one monitoring engine 36. In another option, the second networked device 33 hosts an entire remote intrusion monitoring solution comprising the intrusion detection engine 34, the at least one virtual model 35, and the monitoring engine 36 on the same server (second networked device 33), for example. In an example, the network link between the gateway server 32 and the second networked device 33 may be protected using a Virtual Private Network (VPN) or another packet encapsulation method. Typically, the gateway server 32 hosts the intrusion detection engine 34, because the gateway server 32 is connected to the same network as the set of first networked devices 38.

Of course, the intrusion detection engine 34, the at least one virtual model 35, and the monitoring engine 36 may be located on separate servers or computers, with the second networked device 33 acting as a gateway or supporting a virtual private network facilitating communication between the separate servers or computers. The intrusion detection engine 34, the at least one virtual model 35, and the monitoring engine 36 may be hosted on separate edge devices, in separate cloud servers, or even at separate geographical locations, provided the intrusion detection engine 34 is connected to the same network as the set of first networked devices 38.

One or more of the intrusion detection engine 34, the at least one virtual model 35, and the monitoring engine 36 may be hosted by servers with elastic compute capability. In other words, as the number of first networked devices in the set of first networked devices 38a, 38b, 38c expands, new instantiations of corresponding virtual models 35 may be initiated. An appropriate server equipped for elastic compute capability is capable of rapidly increasing or decreasing the relevant computational resources for hosting at least one of the intrusion detection engine 34, the at least one virtual model 35, and the monitoring engine 36. One or more of the intrusion detection engine 34, the at least one virtual model 35, and the monitoring engine 36 may be implemented as micro services, for example using the "Docker" ™ framework.

Figure 3:
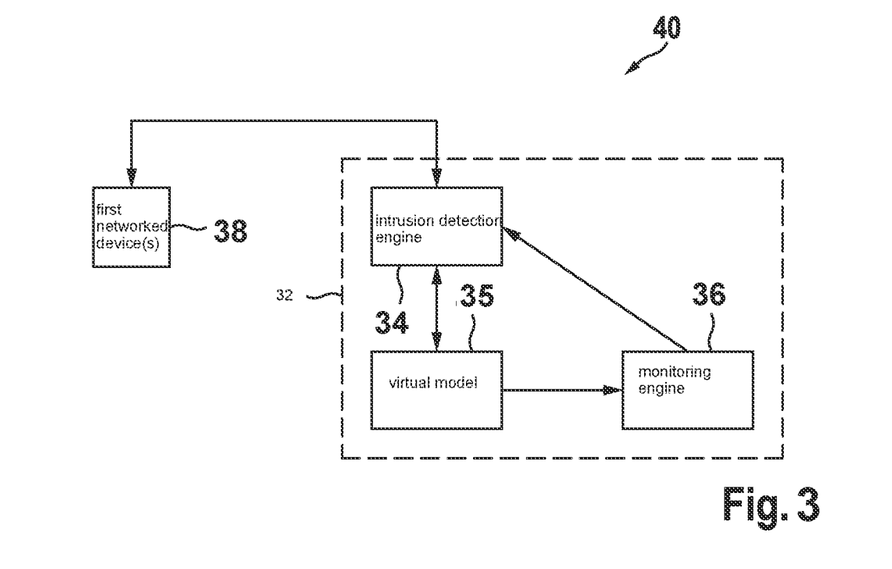
FIG. 3 schematically illustrates an example of operative functions of an approach for remote intrusion detection, in accordance with an example embodiment of the present invention.

FIG. 3 schematically illustrates an example of operative functions of an approach for remote intrusion detection.

The functional architecture 40 to implement the virtual IDS system and method is illustrated in FIG. 3. The virtual IDS system consists of an intrusion detection engine 34 running on a device logically connected to the same network as the first set of networked devices 38. In one example, the intrusion detection engine 34 is hosted by a gateway server 32 connected to the same network as the first set of networked devices 38. In another example, the intrusion detection engine 34 is hosted by a second networked device 33 via an encapsulated (virtual private network) connected to the gateway server 33. The virtual private network to the gateway server 32 enables the intrusion detection engine 34 to be hosted by a remote networked device or a second networked device 33, whilst still being logically connected to the first set of networked devices 38. As an example, the intrusion detection engine 34 could run on a dedicated device connected to the network comprising the first set of networked devices 38, or an edge component that oversees the traffic going to and from the first set of networked devices 38.

The intrusion detection engine 34 is communicatively coupled to at least one virtual model of at least one of the first set of networked devices 38. For example, the at least one virtual model 35 may be hosted by a second networked device 33. The at least one virtual model is a virtual replica (or "digital twin") of a corresponding at least one first networked device 38a.

As an example, the at least one virtual model may be a docker container fully replicating the same real-time operating system configuration and/or operating software environment as the at least one first networked device 38. Alternatively, the at least one virtual model may be a state machine representation of functions of the at least one first networked device 38a relevant to assessing intrusion detection. For example, the at least one virtual model may model the states of TCP port connections associated with the first networked device 38a to enable detection, by monitoring corresponding ports of the at least one virtual model, for a security non-compliance. Example security non—may be an attempted TCP "SYN" attack, a TCP "Reset" attack, or a TCP "Session Hijack". Alternatively, the at least one virtual model may comprise a declarative model comprising key-value pairs for modelling the first networked device 38a. Alternatively, the at least one virtual model may comprise an executable model of the first networked device 38a. The different types of models discussed have different resolutions and thus different computational requirements.

According to an embodiment, the second networked device executes a declarative model or an executable model of a portion of the software configuration executed by the first networked device. According to an embodiment, the second networked device executes a virtualisation of the same software configuration as the software configuration executed by the first networked device.

The at least one virtual model 35 can be executed on the same device as the intrusion detection engine 34, on a different device connected to the same communications network 31, or on an edge device or cloud server.

The functional architecture 40 to implement the virtual IDS system further comprises a monitoring engine 36. The monitoring engine 36 is communicatively coupled to the at least one virtual model 35. As an example, the monitoring engine 36 may communicate with a version of the Linux™ "IPTABLES" application hosted by an operating system of the at least one virtual model 35. For the purpose of intrusion detection, the IPTABLES application in the at least one virtual model 35 is configured, using a set of rules, to recognise anomalous TCP events such as port scans on forbidden ports. If an IPTABLES rule is triggered by the at least one virtual model 35, the monitoring engine 36 may be informed by the at least one virtual model 35. In this case, the at least one virtual model 35 is configured to recognise externally attempted intrusions from the communications network 31 which may, or may not be successful in penetrating the first networked device.

As an alternative, the monitoring engine 36 may be implemented by a script process monitoring a list of active operating system processes active in the at least one virtual model 35, and reporting any new or unexpected process activity to the monitoring engine 36. In this case, the at least one virtual model 35 would implicitly report successful intrusions (that had been able to initiate or change process activity in the at least one virtual model 35) and raise an alarm, for example.

Figure 5:
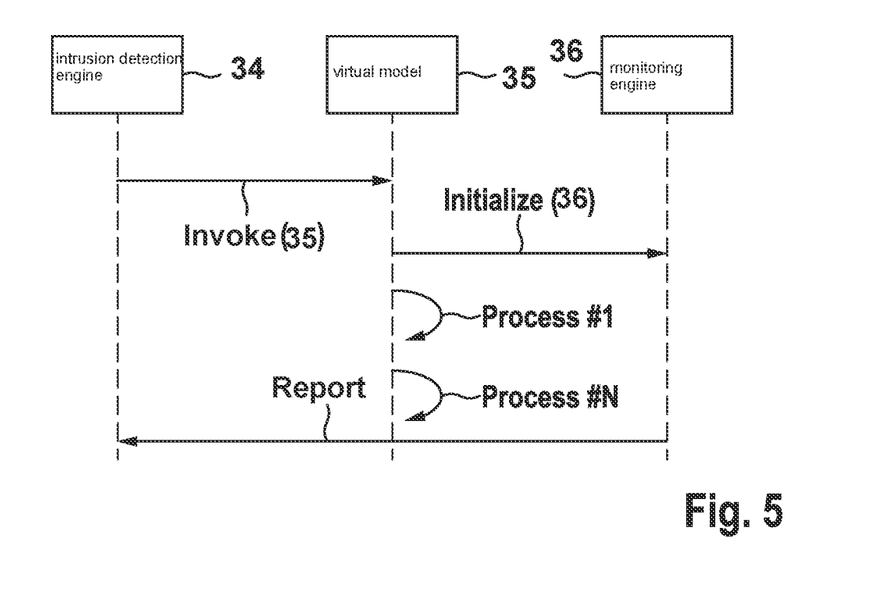
FIG. 5 schematically illustrates an example of a messaging flow between elements of a remote intrusion detection system, in accordance with the present invention FIG. 6 schematically illustrates an example of operating environment of a networked device and its digital twin according to aspects discussed in this specification.

FIG. 5 schematically illustrates an example of a messaging flow between elements of a remote intrusion detection system.

Based on the functional description of FIG. 3, the regular network traffic routed from the communications network 31 via, for example, gateway server 32 to a first networked device 38a in the set of first networked devices 38 is duplicated by an intrusion detection engine 34 connected to the same network as the first networked device 38a (Intrusion detection engine 34 may be located either in the gateway server 32, or another element communicatively coupled to the communications network 31 and the network comprising the first networked device 38a).

The intrusion detection engine 34 is configured to invoke at least one virtual model 35 hosted by, for example, a second networked device 33. In other words, the intrusion detection engine 34 routes the duplicated network packet to an emulated version of the first networked device 38a, and applies the duplicated network packet to the at least one virtual model 35, as denoted by the arrow "invoke(35)" in FIG. 3.

According to an embodiment, the method further comprises detecting, using the monitoring engine, an anomalous event associated with the at least one virtual model of the first network device hosted by the second networked device in response to the duplicated network communication. According to an embodiment, the method further comprises reporting, via the monitoring engine, the occurrence of the anomalous event to the intrusion detection engine.

Upon receiving the duplicated network packet, the at least one virtual model 35 is, in an example, configured to initialise one or more monitoring engines 36 in communication with, or even integrated into the at least one virtual model 35. The at least one virtual model 35 processes the duplicated network traffic whilst the one more monitoring engines 36 monitors, for example, the port activity of the at least one virtual model 35 and/or the active processes of the at least one virtual model 35. If the one or more monitoring engines 36 detects an anomaly, the anomalies may be reported to the intrusion detection engine 34.

For example, upon receiving reports of anomalies, the intrusion detection engine 34 is configured to initiate one or more response steps according to whatever policy is to find in the IDS for handling an anomaly or intrusion. For example, the intrusion detection engine 34 may be configured to signal to a remote security centre via a wide area network connection 29 that an intrusion has been detected.

According to an embodiment, the monitoring engine detects that the duplicated network communication comprises an anomalous port scan of one or more ports of the at least one virtual model of the first network device hosted by the second networked device. According to an embodiment, the monitoring engine detects that the duplicated network communication is associated with an anomalous processing environment activity of the at least one virtual model of the first network device hosted by the second networked device. According to an embodiment, the monitoring engine detects that the duplicated network communication is associated with an anomalous communications protocol when applied to the at least one virtual model of the first network device hosted by the second networked device.

The rationale behind the solution is as follows. If the first networked device 38a can be replicated (with sufficient precision) using at least one virtual model 35, and if the same network traffic received by the first networked device 38a is received by the at least one virtual model 35, then the at least one virtual model 35 will exhibit close, or identical, behaviour to that of the first networked device 38a. Consequently, intrusion detection can be performed by monitoring the at least one virtual model 35 rather than the first networked device 38a. Beneficially, the at least one virtual model 35 can be executed remotely to the first networked device 38a, whilst at the same time allowing a precise intrusion detection.

Figure 6:
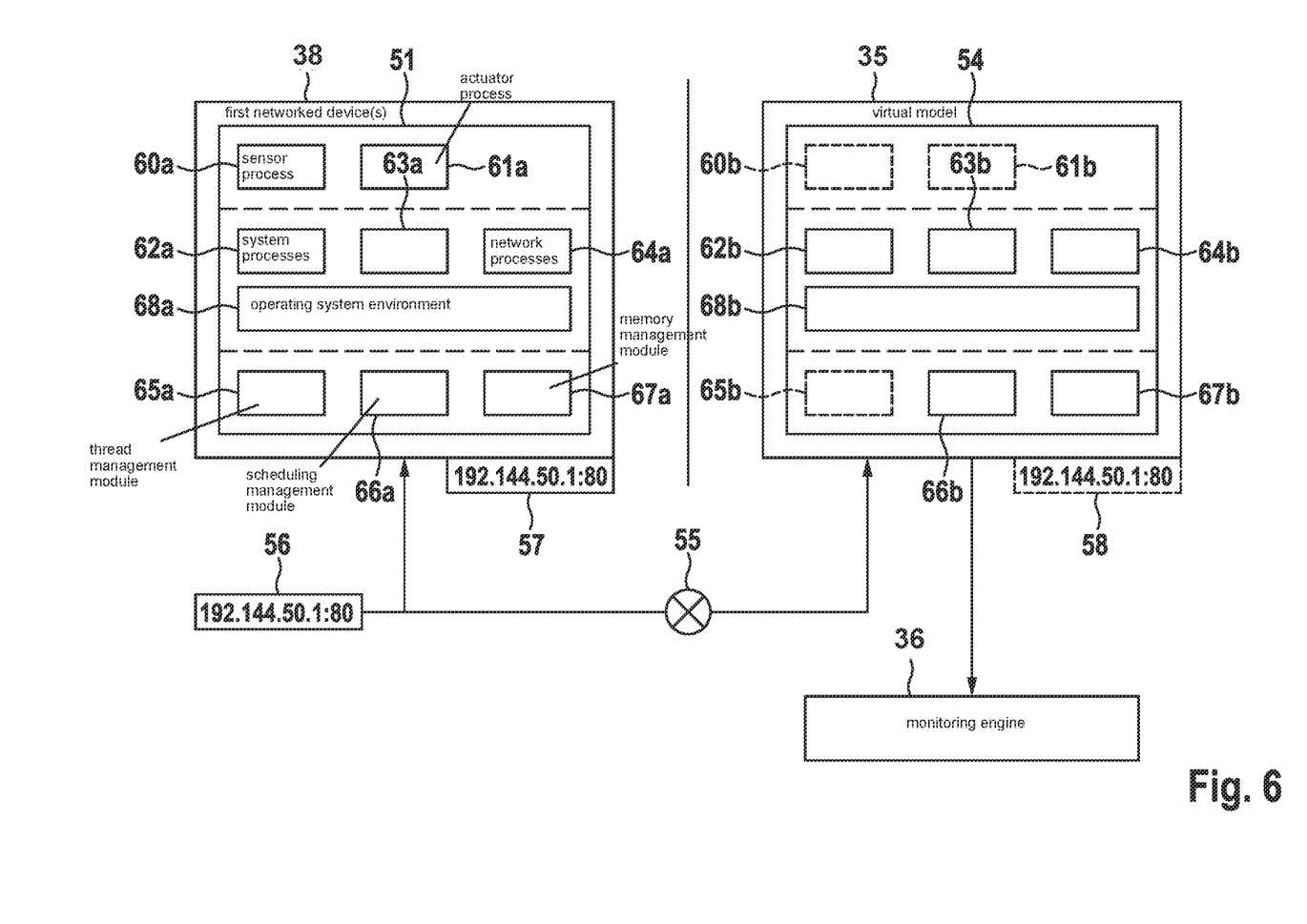

FIG. 6 schematically illustrates an example of operating environment of a networked device and its digital twin according to aspects discussed in this specification.

In FIG. 6, the operating environment 51 of a first networked device 38a may comprise, for example, a kernel layer comprising at least a thread management module 65a, a scheduling management module 66a, and a memory management module 67a. The operating system environment 68a of a first networked device 38a may comprise a higher layer comprising system processes 62a (such as those associated with file system management, cryptography, watchdogs, and the like), driver processes (such as those associated with GPIO, UART, I2C drivers and the like), and networking processes 64a (such as those associated with IPv4 or IPv6, TCP/UDP, WiFi™, and Bluetooth™, for example). The operating environment 51 of the first networked device 38a may comprise application layer functionality such as a sensor process 60a, and an actuator process 61a.

Accordingly, the operating environment 51 of the first network device 38a is fully or partially duplicated or emulated by the at least one virtual model 35 as duplicated operating environment 54. The correspondingly numbered elements in box 54 of FIG. 6 represent corresponding duplicated processes of the operating environment 51 of the first networked device 51.

The at least one virtual model 35 may duplicate a full resolution version of the first network device 38a as a digital twin. In another example, various less-important aspects of the operating environment 51 of the first network device 38a may be omitted from the at least one virtual model 35, as denoted by dotted boxes associated with duplicated operating environment 54. The dotted boxes may be implemented as stubbed software modules in the at least one virtual model 35. The at least one virtual model 35 is configured to report anomalous events and/or ordinary operational events to the monitoring engine 36.

In an example, each first network device 38 has a corresponding monitoring engine 36. However, a one-to-one correspondence between first network devices 38 and monitoring engines 36 is not essential. For example, one monitoring engine 36 may be considered configured to detect anomalous events from a plurality, or all, of first network devices 38a, 38b, 38c. The monitoring engine 36 may be configured to apply detected anomalous communications to a machine learning process, so that intrusion patterns across a plurality of network devices 38a, 38b, 38c in the first network can be detected.

In operation, a network address of a gateway server 32 may communicate an anomalous packet 56, such as a TCP or UDP packet communication addressed to an anomalous transport port 57 of the first network device 38a, representing the first step of an intrusion attack on the first networked device 38a. For example, no direct monitoring process of the first networked device 38a is performed by the first networked device 38a. The anomalous packet is duplicated by element 55, for example, an intrusion detection engine 34 hosted by a gateway server 32 having a network connection to the first networked device 38a.

The duplicated anomalous network communication is applied to an emulated anomalous transport port 58 by the at least one virtual model 35 of the first networked device 38a. Because the at least one virtual model 35 mimics the behaviour of the first network device 38a, attempted intrusions into the first network device 38a can be replicated at a remote location.

According to an embodiment, software (for example, drivers or operating system modules) comprised on the first networked device 38 is updated. When this occurs, the same software update is applied to the at least one virtual model 35.

According to an embodiment, the first networked device comprises an embedded processor, and wherein at least one of the intrusion detection engine, monitoring engine, and second networked device are hosted on one or more of a gateway server, edge server, or cloud server.

According to an embodiment, the method further comprises:
  detecting, at a subscription server, a connection of the first networked device to the network;
  obtaining an identifier of the first networked device and comparing the identifier to a plurality of records in the subscription server;
  instantiating the at least one virtual model of the first networked device if the first networked device is associated with a valid user account at the subscription server, wherein the at least one virtual model is obtained from a datastore comprising a plurality of virtual models of a plurality of networkable devices; and
  metering, at the subscription server, a usage of the at least one virtual model of the first networked device.

Turning briefly back to FIG. 2, the system 30 may, for example, comprise a subscription server 39a and a data store 39b. The subscription server 39a comprises customer-related records, and the data store 39b comprises blank, or saved, versions of virtual models that correspond to the types of first networked devices in the set of first networked devices 38a, 38b, 38c.

For example, an industrial site 37 may maintain a user account at the subscription server 39a. A user may connect to the communications network 31 a further first networked device 38c. The connection of the further first networked device 38c is detected by the gateway server 32, and the event is forwarded to the subscription server 39a. The subscription server 39a looks up the record of the user account related to the industrial site 37 and, if the subscription server 39a determines that a record related to the industrial site 37 exists in the subscription server 39a, proceeds to interrogate whether the further first networked device 38c has previously been connected to the gateway server 32, or is a newly connected first networked device 38c.

If the further first network device 38c has previously been connected to the gateway server 32, the subscription server 39a looks up in the data store 39b a saved version of at least one virtual model related to the further first networked device 38c. The subscription server 39a arranges for the saved version of the at least one virtual model related to the further first networked device 38c to be instantiated in the second network device 33 for example.

If the further first networked device 38c is being newly connected to the gateway server 32, the subscription server 39a creates a new networked device record corresponding to the further first networked device 38c. In this case, the further first networked device 38c transmits an identifier, such as a product type code, to the subscription server 39a. This enables the subscription server 39a to look up in, and obtain from, the data store 39b a blank or uninitiated version of the at least one virtual model 35, and to instantiate the at least one virtual model 35 in the second networked device 33, such that it enables tracking of network events associated with the further first networked device 38c.

When a first networked device from the set of first networked devices 38 is removed from the communications network 31 such that it is not in contact with the gateway server 32 any longer, for example, this may be detected by the subscription server 39a. The corresponding at least one virtual model 35 at the second networked device 33 is paused, for example, in the last state that it was in before the related first networked device was removed from the communications network 31. The corresponding at least one virtual model 35 is then saved in the datastore 39b (this may be coordinated by the subscription server 39a, the second networked device 33, or another server, edge device, or cloud service present in the communications network 31).

According to an embodiment, the method further comprises:
  generating an invoice based on the metering of the usage of the at least one virtual model of the first networked device.

As the subscription server 39a monitors the number and type of first networked devices 38 at a given industrial location 37 being operated, invoices may be generated and raised to enable a virtual intrusion detection service to be billed for. Many subscription models can be supported by the subscription server 39a. For example, a time integral related to the number of virtual models operating at the second networked device 33 over time may determine the invoice level. The number of intrusions detected by a monitoring engine 36 may determine or influence the invoice level. The type of at least one virtual model instantiated at the second network device 33 may determine or influence invoice level.

Furthermore, a plurality of different virtual models covering the same type of first networked device 38 may be provided at different resolutions. For example, a high resolution virtual model simulating the full functionality of a real-time operating system, for example, may be invoiced at a more expensive rate than a low resolution virtual model in which a large proportion of the functionality of the real-time operating system is stubbed, rather than simulated by the second networked device 33.

Figure 4:
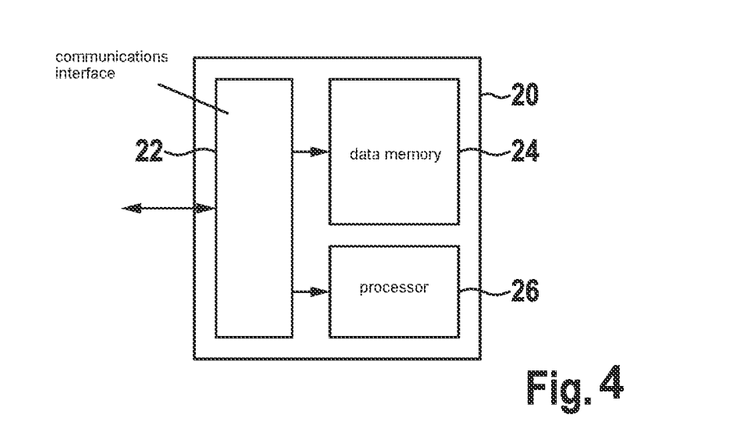
FIG. 4 schematically illustrates an example apparatus for remote intrusion detection according to the second aspect of the present invention.

FIG. 4 schematically illustrates an apparatus 20 for remote intrusion detection according to the second aspect.

According to a second aspect, there is provided an apparatus 20 for remote intrusion monitoring of a networked device, comprising a communications interface 22, a data memory 24, and a processor 26. The communications interface is configured to communicate with a network to receive at least one network communication to a first networked device. The processor is configured to host a processing environment in the data memory comprising at least one virtual model of the first networked device, an intrusion detection engine, and a monitoring engine, wherein the intrusion detection engine is configured to receive a duplicate of the at least one network communication to a first networked device, and to apply the duplicated network communication to the at least one virtual model of the first network device hosted by the processing environment, and to monitor, using the monitoring engine hosted by the processing environment, the at least one virtual model of the first networked device upon reception of the duplicated network communication by the at least one virtual model.

The data memory 24 of the apparatus 20 has a non-volatile and volatile component. The volatile component, for example, is RAM (Random Access Memory or Cache) used to support the execution of programs by the processor 26. The non-volatile component, for example, enables the long-term storage of operating software modules of the ECU.

The processor 26 of the apparatus 20 is configured to load the operating software modules the data memory 24, and to communicate to external devices connected to the apparatus 20 via the input output interface 22. The input output interface may comprise at least a network connection, to enable the reception of duplicated data packets and interaction with a data store 39a such that at least one virtual model may be downloaded to the apparatus and instantiated, for example. Alternatively, the at least one virtual model is stored natively in the memory of the apparatus 20. The processor 26 is, for example configured to support a software environment capable of hosting one or more virtual models of a first networked device 38a, as discussed elsewhere in this specification. For example, the processor 26 may host the one or more virtual models 35 as microservices in Docker™ containers.

According to a third aspect, there is provided a computer system 30 comprising a wide area network connection 29, a first networked device 38a, a second networked device 33, and a communications network 31 configured to communicatively couple the wide area network connection 29, the first 38a and second 33 networked devices. The second networked device 33 is configured to host at least an intrusion detection engine 34, at least one virtual model 35 of the first networked device 38a, and a monitoring engine 36. The intrusion detection engine 34 is configured to receive a network communication from the wide area connection 29 to the first networked device 38a, and the intrusion detection engine 34 is configured to transmit a duplicate of the network communication to the at least one virtual model 35. The intrusion detection engine 34 is configured to apply the duplicated network communication to the at least one virtual model 35 hosted by the second networked device 33, and the monitoring engine 36 is configured to monitor the at least one virtual model 35 upon reception of the duplicated network communication by the at least one virtual model 35.

According to an embodiment, the computer system further comprises a subscription server 39a and a datastore 39b comprising a plurality of virtual models of a plurality of networkable devices. The subscription server is configured to detect a connection of the first networked device to the network, to obtain an identifier of the first networked device 38a and to compare the identifier to a plurality of records in the subscription server. The second networked device 33 is configured to instantiate the at least one virtual model 35 of the first networked device 38a if the first networked device 38a is associated with a valid user account at the subscription server 39a, wherein the at least one virtual model 35 is obtained from the datastore 39b, and the computer system is further configured to meter, at the subscription server 39a, a usage of the at least one virtual model 35 of the first networked device 38a.

According to a fourth embodiment, there is provided a computer readable medium comprising executable program instructions which, when executed by a processor, performs the steps of the first aspect or its embodiments.

The examples provided in the figures and described in the foregoing written description are intended for providing an understanding of the principles of this specification. No limitation to the scope of the present is intended thereby. The present specification describes alterations and modifications to the illustrated examples. Only the preferred examples have been presented, and all changes, modifications, and further applications to these within the scope of the specification are desired to be protected.

What is claimed is:

1. A computer implemented method for remote intrusion monitoring of a networked device, comprising the following steps:
    receiving, by an intrusion detection engine connected to a network, a network communication to a first networked device;
    transmitting, via the intrusion detection engine, a duplicate of the network communication to a second networked device, wherein the second networked device hosts at least one virtual model of the first networked device, wherein the at least one virtual model at least partially duplicates or emulates an internal operating environment of the first networked device, and wherein the second networked device is a gateway server;
    applying the duplicated network communication to the at least one virtual model of the first network device hosted by the second networked device;
    monitoring, using a monitoring engine, the at least one virtual model of the first networked device upon reception of the duplicated network communication by the at least one virtual model;
    detecting, at a subscription server, a connection of the first networked device to the network;
    obtaining an identifier of the first networked device and comparing the identifier to a plurality of records in the subscription server;
    instantiating the at least one virtual model of the first networked device on the second network device when the first networked device is associated with a valid user account at the subscription server, wherein the at least one virtual model is obtained from a datastore including a plurality of virtual models of a plurality of networkable devices;
    metering, at the subscription server, a usage of the at least one virtual model of the first networked device; and based on detecting the first networked device is removed from the network such that the first networked device is not in contact with the gateway server any longer:
pausing the at least one virtual model in a last state that the at least one virtual model was in before the first network device was removed from the network, and
storing the paused at least one virtual model in the last state in the datastore.

2. The computer implemented method according to claim 1, further comprising:
detecting, using the monitoring engine, an anomalous event associated with the at least one virtual model of the first network device hosted by the second networked device in response to the duplicated network communication.

3. The computer implemented method according to claim 2, further comprising:
reporting, via the monitoring engine, the occurrence of the anomalous event to the intrusion detection engine.

4. The computer implemented method according to claim 1, wherein the monitoring engine detects that the duplicated network communication includes an anomalous port scan of one or more ports of the at least one virtual model of the first network device hosted by the second networked device.

5. The computer implemented method according to claim 1, wherein the monitoring engine detects that the duplicated network communication is associated with an anomalous processing environment activity of the at least one virtual model of the first network device hosted by the second networked device.

6. The computer implemented method according to claim 1, wherein the monitoring engine detects that the duplicated network communication is associated with an anomalous communications protocol when applied to the at least one virtual model of the first network device hosted by the second networked device.

7. The computer implemented method according to claim 1, wherein the second networked device executes a declarative model or an executable model of a portion of a software configuration executed by the first networked device.

8. The computer implemented method according to claim 1, wherein the second networked device executes a virtualisation of the same software configuration as a software configuration executed by the first networked device.

9. The computer implemented method according to claim 1, wherein the first networked device includes an embedded processor, and wherein at least one of the intrusion detection engine, the monitoring engine, and the second networked device are hosted on one or more of a gateway server, or edge server, or cloud server.

10. The computer implemented method according to claim 1, further comprising:
generating an invoice based on the metering of the usage of the at least one virtual model of the first networked device.

11. The computer implemented method according to claim 1, wherein the at least one virtual model is a digital twin of the first networked device.

12. The computer implemented method according to claim 1, wherein the internal operating environment includes a kernel layer including a thread management module, a scheduling management module, and a memory management module.

13. The computer implemented method according to claim 1, wherein the internal operating environment includes an operating system environment including system processes, driver processes, and network processes.

14. The computer implemented method according to claim 1, wherein the internal operating environment includes application layer functionality including a sensor process and an actuator process.

15. An apparatus for remote intrusion monitoring of a networked device, comprising:
a communications interface;
a data memory; and
a processor;
wherein the communications interface is configured to communicate with a network to receive at least one network communication to a first networked device;
wherein the processor is configured to host a processing environment in the data memory including at least one virtual model of the first networked device, an intrusion detection engine, and a monitoring engine, wherein the intrusion detection engine is configured to receive a duplicate of the at least one network communication to a first networked device, and to apply the duplicated network communication to the at least one virtual model of the first network device hosted by the processing environment, and to monitor, using the monitoring engine hosted by the processing environment, the at least one virtual model of the first networked device upon reception of the duplicated network communication by the at least one virtual model, wherein the at least one virtual model at least partially duplicates or emulates an internal operating environment of the first networked device;
wherein the apparatus is a gateway server and is in communication with a subscription server, the subscription server including a datastore including a plurality of virtual models of a plurality of networkable devices, wherein the subscription server is configured to detect a connection of the first networked device to the network, to obtain an identifier of the first networked device and to compare the identifier to a plurality of records in the subscription server, and wherein the subscription server is configured to instantiate the at least one virtual model of the first networked device on the apparatus if the first networked device is associated with a valid user account at the subscription server, wherein the at least one virtual model is obtained from the datastore, and to meter, at the subscription server, a usage of the at least one virtual model of the first networked device, and wherein the subscription server is configured to, based on detecting the first networked device is removed from the network such that the first networked device is not in contact with the gateway server any longer:
pause the at least one virtual model in a last state that the at least one virtual model was in before the first network device was removed from the network, and
store the paused at least one virtual model in the last state in the datastore.

16. A computer system, comprising:
a wide area network connection;
a first networked device;
a second networked device; and
a communications network configured to communicatively couple at least the wide area network connection and the first and second networked devices;
wherein the second networked device is configured to host at least an intrusion detection engine, at least one virtual model of the first networked device, and a monitoring engine, the at least one virtual model at least partially duplicating or emulating an internal operating environment of the first networked device, wherein the second networked device is a gateway server;

wherein the intrusion detection engine is configured to receive a network communication from the wide area connection to the first networked device, and the intrusion detection engine is configured to transmit a duplicate of the network communication to the at least one virtual model; and wherein the intrusion detection engine is configured to apply the duplicated network communication to the at least one virtual model of the first networked device hosted by the second networked device, and the monitoring engine is configured to monitor the at least one virtual model of the first networked device upon reception of the duplicated network communication by the at least one virtual model;

a subscription server; and a datastore including a plurality of virtual models of a plurality of networkable devices;

wherein the subscription server is configured to detect a connection of the first networked device to the network, to obtain an identifier of the first networked device and to compare the identifier to a plurality of records in the subscription server; and wherein the subscription server is configured to instantiate the at least one virtual model of the first networked device on the second networked device if the first networked device is associated with a valid user account at the subscription server, wherein the at least one virtual model is obtained from the datastore, and to meter, at the subscription server, a usage of the at least one virtual model of the first networked device;

wherein the subscription server is configured to, based on detecting the first networked device is removed from the network such that the first networked device is not in contact with the gateway server any longer:

pause the at least one virtual model in a last state that the at least one virtual model was in before the first network device was removed from the network, and store the paused at least one virtual model in the last state in the datastore.

17. A non-transitory computer readable medium on which are stored program instructions for remote intrusion monitoring of a networked device, the program instructions, when executed by a computer, causing the processor to perform the following steps:

receiving, by an intrusion detection engine connected to a network, a network communication to a first networked device;

transmitting, via the intrusion detection engine, a duplicate of the network communication to a second networked device, wherein the second networked device hosts at least one virtual model of the first networked device, the at least one virtual model at least partially duplicating or emulating an internal operating environment of the first networked device;

applying the duplicated network communication to the at least one virtual model of the first network device hosted by the second networked device; and monitoring, using a monitoring engine, the at least one virtual model of the first networked device upon reception of the duplicated network communication by the at least one virtual model;

detecting, at a subscription server, a connection of the first networked device to the network;

obtaining an identifier of the first networked device and comparing the identifier to a plurality of records in the subscription server;

instantiating the at least one virtual model of the first networked device on the second network device when the first networked device is associated with a valid user account at the subscription server, wherein the at least one virtual model is obtained from a datastore including a plurality of virtual models of a plurality of networkable devices;

metering, at the subscription server, a usage of the at least one virtual model of the first networked device;

based on detecting the first networked device is removed from the network such that the first networked device is not in contact with the gateway server any longer:

pausing the at least one virtual model in a last state that the at least one virtual model was in before the first network device was removed from the network, and storing the paused at least one virtual model in the last state in the datastore.

* * * * *